Feb. 12, 1957 L. RIEBMAN 2,781,510

ANTI-JAM RECEIVER FOR PULSE ECHO DETECTION SYSTEM

Filed Oct. 11, 1945 2 Sheets-Sheet 1

Inventor

LEON RIEBMAN

By Ralph L. Chappell

Attorney

Inventor
LEON RIEBMAN
By Ralph L. Chappell
Attorney

United States Patent Office 2,781,510

Patented Feb. 12, 1957

2,781,510

ANTI-JAM RECEIVER FOR PULSE ECHO DETECTION SYSTEM

Leon Riebman, United States Navy

Application October 11, 1945, Serial No. 621,656

11 Claims. (Cl. 343—17.1)

(Granted under Title 35, U. S. Code (1952), sec. 266)

This invention relates to a method of and means for carrying on radio transmission and reception through deliberate man-made interference signals.

In all the various radio systems, including radio echo ranging and television, there exist two general types of interference, unintentional and deliberate. The more troublesome of the two is that which is deliberate and intended to destroy the effectiveness of the radio equipment. Unintentional interference can generally be avoided by providing the transmitting equipment with a given transmission characteristic and the receiving equipment with apparatus which is held singly responsive to the given transmission characteristic. Deliberate interference, on the other hand, is especially designed to impair radio communications and is therefore not so readily avoided.

One of the radio fields in which deliberate interference is predominant and perhaps the most troublesome is radio echo ranging. For this reason the present invention will be described as applied to a radio echo ranging system and in particular to a range and bearing type of radio ranging system which is similar in many respects to that of H. R. Senf et al., Serial No. 468,106, entitled Radio Echo System for Aircraft, filed December 7, 1942, now U. S. Patent 2,546,170, dated March 27, 1951. It is understood that the principles taught by the invention are admirably suited to other types of radio systems.

An object of this invention is to provide a method of and a means for the reception of pulsed radio frequency signals, which signals will be identifiable at the output of the receiving means notwithstanding the presence of substantial interfering signals.

Another object of this invention is to provide, in a receiving system of the foregoing character, a method of and a means for maintaining the receiver output amplitude independent of the level of interfering signals.

Figure 1:
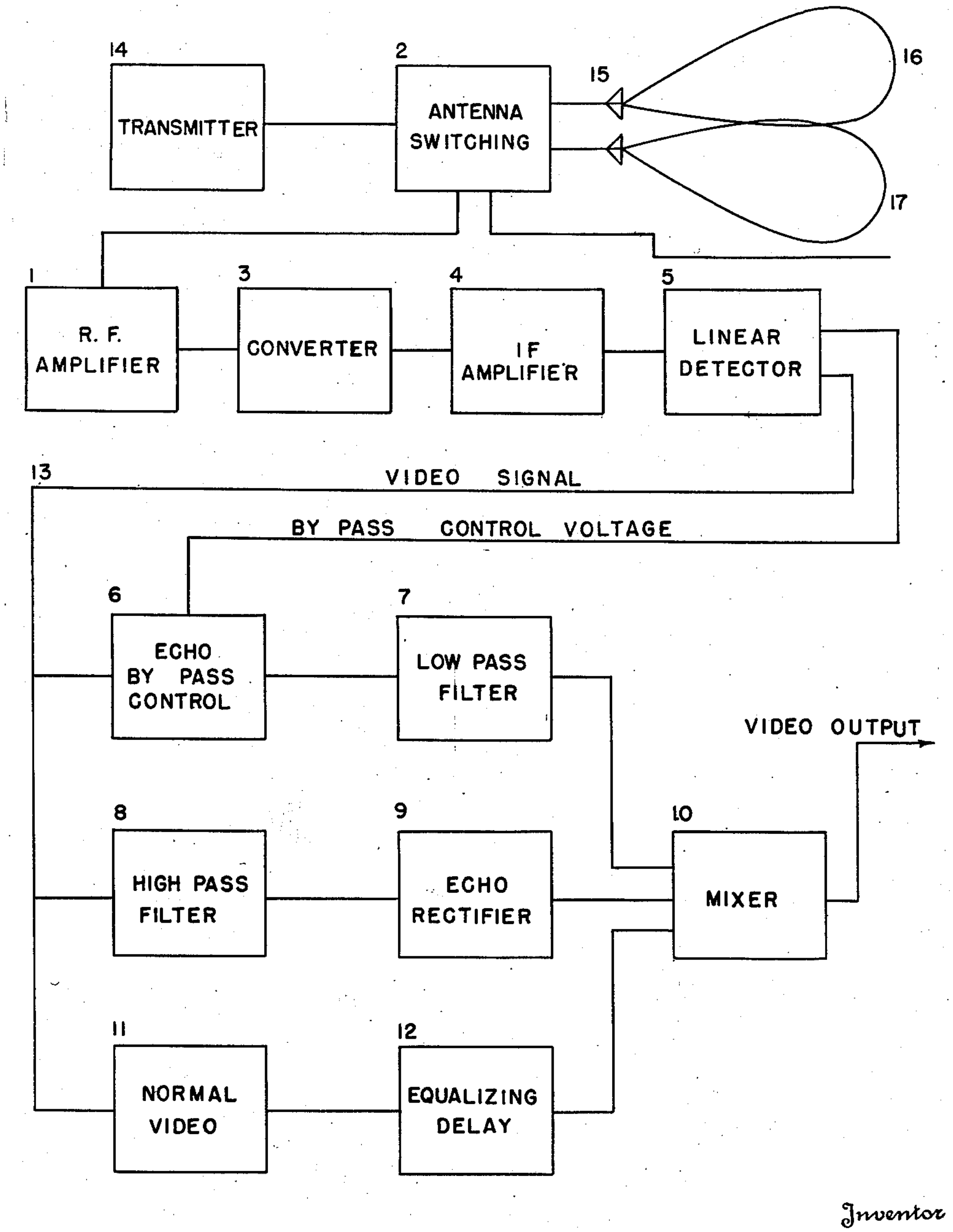
Fig. 1 shows a block diagram of the circuit components of a radio echo location system embodying the invention.

In accordance with the apparatus of Fig. 1, the radio echo ranging operation consists of first emitting a regularly recurrent pulse signal from antenna system 15 by transmitter 14. The resulting echo signals are received by the same antenna system 15 and are coupled through a suitable antenna switching device 2 such as the type disclosed in the Senf et al. application, supra, to a radio frequency amplifier section 1. After amplification by the radio frequency amplifier 1 the echo signals are converted to an intermediate frequency by converter 3, amplified by intermediate frequency amplifier 4, demodulated by detector 5 and finally applied through lead 13 and a suitable video frequency amplifier section to a cathode ray tube, not shown, for visual presentation. In the particular ranging system in which the present invention is embodied, range measurements are made on a cathode ray tube according to fundamental ranging principles. Bearing indications are obtained by a method known as lobe switching in which an antenna system providing two divergent but overlapping beam patterns 16 and 17 is used. The ranging system is switched alternately from one beam pattern to the other at a relatively low frequency, and means are provided for separate but adjacent visual presentation of the pertinent echo pulses received through each beam pattern. Accordingly, when the antenna is oriented with respect to the object from which the pertinent echo pulses are emanating so that the echo signal received through one of the two beam patterns is equal to that received through the other, echo pulses of equal amplitude will be exhibited on the cathode ray tube. The degree of overlap of the beam patterns is determined, according to their shape, so that departures from this antenna position will occasion large and readily discernible differences in the amplitudes of the exhibited pulses.

Deliberate efforts to impair the effectiveness of ranging will commonly consist of transmitting an interfering signal, which either overloads one or more of the receiver stages or obscures the visual presentation of the echo signal. The interfering signal is usually of the same or nearly the same frequency as that of the pulse signal and is modulated in a way intended to accomplish the maximum impairment of reception.

In the particular type of ranging equipment under consideration, interfering signals emanating from sources not in line with the objects from which the pertinent echo signals are emanating enter the receiving equipment at a different amplitude level for each of the two antenna beam patterns when the orientation of the antenna itself is in line with said object.

One of the more successful techniques for circumventing the reduction in intelligibility occasioned by interfering signals of enemy origin involves converting the pulse signal energy to new frequencies by heterodyning the pulse frequency with those of the interfering signals. As is well known in the radio art, such heterodyne action produces output frequency components which, in addition to all the frequencies present in the input, comprise the sum and difference frequencies of such input, frequency components corresponding to the Fourier series analysis of the envelope of the applied signals, and higher order combinations of the input frequency. The pulse energy in the new difference frequencies thus produced may be salvaged by suitable filtering methods. When such a technique is used, the output amplitude, in the general case, will be a function of the interference signal as well as the pulse signal.

It is apparent that a requisite for the effective use of equipment using lobe switching for bearing determination is that the receiver echo signal output amplitude be a function of the antenna gain pattern only. This requisite cannot be met if, as in the preceding paragraph, the interfering signal level contributes to the determination of this output amplitude. With circumstances in which it is required both that pulse signal energy be salvaged in heterodyne frequencies and that the receiver output be independent of the level of the interfering signal used in obtaining said frequencies, it is necessary that means be provided for eliminating the variations in the final output which are a result of variations in the interfering signal level.

The ranging equipment in which this invention is disclosed both preserves the intelligibility of the echo pulse signal despite the presence of a continuous wave interfering signal of intensity up to many thousand times that of the pulse signal, and provides a pulse output amplitude independent of the interfering signal level.

In the particular echo ranging system in connection with which this invention will be described, the carrier frequency is of the order of 1000 megacycles. The received echo pulse is of approximately 1.25 microseconds duration and accordingly, the important video frequencies of the pulse are below 800 kilocycles. In operation, during reception of a continuous wave interference signal, transmitter 14 is detuned from the jamming signal, i. e. from the frequency to which the receiver is tuned, by from 1.5 megacycles to 3 megacycles. The receiver is not retuned, but has a pass band broad enough to accommodate this shift in the transmitter frequency. Also the intermediate frequency of the receiver is high enough to provide, in accordance with known receiver design considerations, an intermediate frequency pass band wide enough to accommodate this shift of the transmitter frequency. Under these circumstances the output of the intermediate frequency amplifier section 4 will contain the heterodyned interfering frequency during the intervals between pulses and the combination of the latter frequency and the heterodyned pulse frequency during pulse reception. The amplifying characteristics of the intermediate frequency section are arranged to maintain a particular relationship between the components of this combination, which relationship will be described subsequently.

The linear detector 5 acts as a demodulator for obtaining the video frequencies in the pulse and as a converter whose output includes the heterodyne difference frequencies between the video frequency in the pulse and the heterodyned interfering signal. These difference frequencies may be considered as carriers of salvaged echo energy. If for illustrative purposes it is assumed that transmitter 14 has been detuned from the jamming frequency by 2 megacycles, then, since the important video frequencies are between the pulse repetition frequency and 800 kilocycles, most of the difference frequencies from which it is desirable to recover the echo energy will be the heterodyne difference frequency between the frequency increment said transmitter is detuned, i. e. 2 megacycles, and the video components of the pulse, i. e. up to 800 kilocycles. This amounts to a band of different frequencies from 800 kilocycles below 2 megacycles or 1200 kilocycles to 800 kilocycles above 2 megacycles or 2800 kilocycles. It is desirable that the transmitter 14 be detuned sufficiently so that the video frequency components and these difference frequency components in the detector output can be separated and utilized in the manner hereinafter to be described.

The video circuits consist of three channels. In the presence of interference the two upper channels, blocks 6 and 7 and blocks 8 and 9 are used and the lower channel, blocks 11 and 12, is rendered inoperative. This lower channel is for use in the absence of interfering signals, and, when it is in use, the two upper channels are rendered inoperative. It comprises a normal video stage 11 and delay line 12, both of which are known to the art. Delay line 12 functions to delay any video frequency signal which passes through the lower channel in the absence of interference, so that, when entering the visual presentation portion of the radio echo ranging apparatus through mixer 10, they will be in equal time phase with signals delayed by the filters 7 and 8 in the upper channels during the presence of interference. No further mention of this channel will be made in this application.

Under the conditions of interference which have been assumed, the upper two channels will be in operation, and the output of the detector will be applied through lead 13 to block 6, the echo by pass control, and block 8, the high pass filter. The high pass filter accepts only the difference frequencies mentioned above and delivers to the echo rectifier (9) the difference frequency spectrum appearing as bipolar waveforms, which the echo rectifier converts to a form suitable for visual presentation.

When the interfering signal is large relative to the echo signal as is usually the case, the frequency conversion action of linear detector 5 produces in its output the difference frequencies mentioned above, the amplitude of the envelopes of which is substantially independent of the amplitude of the interfering signal and is proportional to the amplitude of the echo signal; consequently, the output of the echo rectifier can be used directly. It is well known in the art that linear detectors, that is detectors whose dynamic characteristic is a straight line throughout the range in which plate current is drawn, have a characteristic frequency conversion action which will produce the above results. However, if the interfering signal amplitude is not sufficiently large, the amplitude of the envelope of these difference frequencies will be a function of the interfering signal amplitude also. Fortunately, under the latter condition, the echo pulse output of the detector is sufficiently unimpaired to be usable for visual presentation; hence, in this case, the output of the echo rectifier 9 is supplemented by the video frequency components of the echo signal passed through the channel comprising block 6, the echo bypass control, and block 7, the low pass filter. The echo bypass control determines whether or not this channel will be operative. Because the requirements depend upon the interference level, the control voltage for this stage is developed in the detector.

Figure 2:
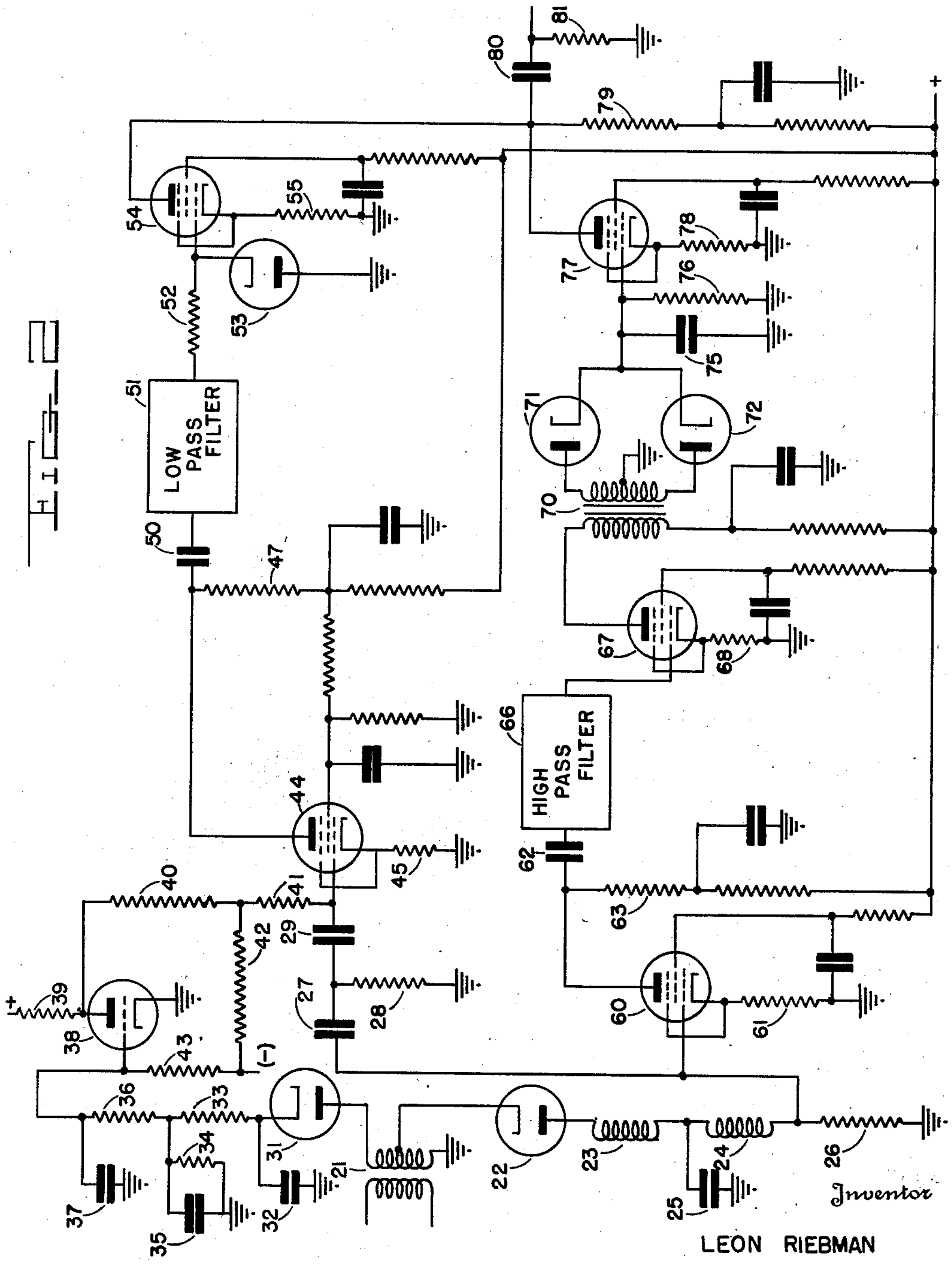
Fig. 2 shows a schematic diagram of pertinent circuits used in this particular embodiment.

A more detailed disclosure of the mode of operation requires reference to Fig. 2.

The intermediate frequency amplifier action is coupled to the detector through transformer 21.

In the preferred embodiment, the intermediate amplifier section is one involving the principles described in copending application Serial No. 621,670, filed October 11, 1945, under the name of Irving H. Page.

In the presence of a continuous wave interfering signal slightly off the transmitter frequency but within the receiver pass band, echo signals will appear in the intermediate frequency section as an envelope modulated at the difference frequencies produced by the heterodyne action. It is necessary to hold this modulating envelope at the same approximate position on the composite response pattern of the section and to suppress or eliminate increases in the interfering signal amplitude in order to accomplish the first requisite of the system; namely, that the linear detector be offered a constant amplitude interfering signal to beat against a linearly amplified echo signal. In this embodiment, this purpose is accomplished by the use of negative feedback in six of the eight intermediate frequency stages as taught by the Page application supra. These stages are equipped with resistor capacitor networks in the cathode circuits such that, as the signal increases, the operating bias of the stage is progressively moved from Class A into Class C. Under critical jamming conditions, the interfering signal will control the bias of the pertinent stage or stages. When a stage is driven into Class C operation, the lower half of the modulating envelope and more than half of the interfering signal is of course, suppressed, and the grid signal comprises the upper half of the modulating envelope mounted on a substantially constant remainder of the interfering signal. Operating on this principle, the cascade of stages is so designed that, if the interfering signal is of sufficient amplitude, the output comprises an approximately constant residue of the interfering frequency and suitably amplified pulse frequencies. Accordingly, the intermediate frequency amplifier section has the characteristics that it has a broad dynamic range for pulsed signals, which dynamic range is unaffected by the presence of continuous signals, and that it simultaneously provides less gain for continuous signals than for pulsed signals when said continuous signals are substantially greater in amplitude than said pulsed signals. The time constants of the negative feedback networks are chosen so that low frequency modulation of the interfering signal is partially eliminated.

Demodulation of the intermediate frequency signal takes place in the linear detector 5, which as shown in Fig. 2 comprises diode 22 and the filter network consisting of choke coils 23 and 24 and capacitor 25. Under the conditions of interference the detector output, containing the pulse video frequencies (up to approximately 800 kilocycles), the above defined heterodyne difference frequencies from which it is desired to salvage pulse echo energy (from 1200 kilocycles to 2800 kilocycles), and the interference modulating frequencies not previously suppressed is applied to the two channels previously mentioned, a channel shown in the upper part of Fig. 2 and a high pass filter channel shown in the lower part of Fig. 2.

In the lower channel on the schematic diagram, the detector output is passed through a conventional video amplifier stage comprising tube 60 and associated circuits. The output of this amplifier stage, which is developed across plate load resistor 63, is coupled to the high pass filter 66, analogous to block 8 of Fig. 1, through capacitor 62.

The high pass filter passes the difference frequencies and suppresses substantially all others. Several considerations are involved in the determination of the cut off frequency of this filter. First, it must be high enough so that substantially all modulating interference frequencies used or likely to be used in the interfering signal are eliminated. Because noise modulation can include very high frequencies, this consideration operates to place the filter cut off frequency as high as possible. Second, cognizance must be taken of the enemy's efforts to keep the interfering transmitter tuned as close to the radar frequency as possible. If the radar transmitter must be tuned far off the interfering transmitter in order that the difference frequencies will pass through a high cut off high pass filter, the likelihood that the enemy will detect the discrepancy and retune the interfering transmitter is increased. This consideration operates to place the filter cut off frequency as low as possible. Third, the filter being a high Q network, is shock excited into damped oscillations by the leading and trailing edges of the pulses. These damped oscillations would impair the pulse definition and reduce the range resolution if permitted to decay normally. Since the leading and trailing edges of pulses excite oscillations with opposite initial polarities, and since the resonant frequency of a high pass filter network is approximately equal to its cut off frequency, approximate cancellation of the damped oscillation can be effected by making the cut off frequency equal to the reciprocal of some multiple of the pulse width. In this embodiment, a cut off frequency equal to unity divided by the pulse width or 800 kilocycles was found satisfactory.

The output of the high pass filter is applied to another video stage comprising tube 67 and its associated circuits. The load impedance of this stage is the primary of transformer 70.

Since the output of the high pass filter consists of a number of cycles of a sinusoidal wave which is symmetrical about the base line, and since the presentation means will utilize a unipolar pulse, it is desirable that both the positive and the negative parts of this sinusoidal wave be rectified and recombined to form a unipolar pulse. Consequently, it is necessary that an equal part of the filter output be inverted in phase and that the signals in both phases be rectified and recombined to form the output pulse.

To accomplish these functions there is provided an echo rectifier, analogous to block 9 of Fig. 1, and described in detail as follows. The secondary of transformer 70 is center tapped to ground so that the transformer serves as a phase splitter. The secondary terminals of the transformer are connected to the plates of diode rectifiers 71 and 72. Capacitor 75 and resistor 76 filter the rectified output from the diodes.

The pulse formed in the diode and filter circuits is applied to the control grid of tube 77. Tube 77 and tube 54, which is similarly placed with regard to the upper channel, have a common load resistor 79; consequently, the two tubes and their associated circuits act as a mixer, analogous to block 10 of Fig. 1, for the two channels.

The final output is coupled to the cathode ray tube presentation circuits, not shown, through the coupling circuit consisting of capacitor 80 and resistor 81.

As has been mentioned previously, the channel just described, i. e., the lower channel on Fig. 2, passes a signal of the desired characteristics if the interfering signal is large enough, but the output of this channel varies as a function of the interfering signal if this condition does not prevail. However, under the latter conditions, the echo pulse energy in the video frequencies is still usable for visual presentation.

The upper channel is designed to bypass a sufficient amount of signal energy in the video pulse frequencies so that the final output amplitude will be independent of the interfering signal level. The amount of signal energy passed through this channel is controlled by the low pass filter 51, which is analogous to block 7 of Fig. 1. As will be explained hereinafter, the bypass control circuits, analogous to block 6 of Fig. 1, comprising tubes 31, 38 and 44 render the channel inoperative for large ratios of interfering signal to echo signal in which the channel is not needed, in order that it will not pass modulating frequencies of the interfering signal.

When the interfering signal to pulse signal ratio is high, substantially all the echo pulse signal energy is contained in the above defined heterodyne difference frequencies, and accordingly the high pass filter channel passes an amount of echo signal energy which is substantially proportional to the echo signal received. When the interfering signal to pulse signal ratio is low, substantially no echo pulse signal energy is contained in these heterodyne difference frequencies, and accordingly the high pass filter channel passes substantially no echo pulse signal energy. For intermediate ratios a portion of the echo pulse signal energy, which portion is a function of the ratio, is contained in the heterodyne difference frequencies, and the high pass filter channel passes this portion. The upper channel on the schematic diagram passes supplementary amounts of signal energy such that the combined final output will have the required independence of the interfering signal level. As the amount of echo energy available in the difference frequencies increases with the interference to signal ratio, the residual echo energy remaining in the video frequencies correspondingly decreases. Consequently, the supplementary amounts of energy required to make the final output independent of the interfering signal level are obtained in the video frequencies of the detector output.

In order that the upper channel accomplish this purpose, it is necessary that signal energy in the difference frequencies be suppressed in low pass filter 51. It is also necessary that the channel be rendered inoperative for high interference to signal ratios in order that modulating frequencies of the interfering signal will not be passed through the upper channel to impair the visual presentation when all of the signal energy is being passed through the lower channel.

The output of detector 22 and its associated circuits is applied to the control grid of tube 44 through a filter comprising capacitiors 27 and 29 and resistor 28. This filter contributes to the elimination of whatever low frequency modulation may be present in the interfering signal. Tube 44 and its associated circuits are a conventional amplification stage in which the control grid bias is determined by the output of the detector circuit comprising diode 31 and its filter network. The output of this detector, which is analogous to the By Pass Control Voltage shown in Fig. 1, is applied to the grid of tube 44 through a direct current amplifier stage. This output will be almost entirely a function of the interfering signal level because the pulse duration is short in relation to the interval between pulses. The filter network comprising resistors 33 and 36 and capacitors 32, 35 and 37 is such that the output of the detector will be responsive to relatively slow changes in the input level such as are occasioned by periodically shifting the antenna beam, but will not be responsive to frequencies as high as the pulse repetition frequency.

Resistors 43, 36, and 34 form a voltage divider to provide a suitable negative bias to the control grid of the D. C. amplifier tube 38.

As the average amplitude of the interfering signal increases, detector 31 and its associated filter increases the potential of the grid of tube 38. As the potential of the grid of tube 38 increases, the potential of the plate decreases. A voltage divider comprising resistor 40 and 42 is connected between the plate of tube 38 and a negative source of voltage, and resistor 41 is connected between the junction of resistor 40 and 42 and the grid of tube 44; accordingly, as the potential at the plate of tube 38 decreases, the bias on tube 44 decreases also.

Tube 44 is a sharp cutoff tube. The circuit elements are selected with regard to the characteristics of tubes 38 and 44 so that, as the ratio of interfering signal to echo signal increases, tube 44 retains substantially constant amplification properties until the critical ratio is reached at which point tube 44 is cut off sharply.

The output of the amplification stage containing tube 44 is applied to a low pass filter 51 through capacitor 50. This filter rejects the difference frequencies which are utilized to carry the signal energy in the lower channel. Filter 51 is designed by methods known to the art to have the same cutoff frequency and approximately the same time delay as the high pass filter in the lower channel. It is necessary that both channels have the same time delay in order that their outputs will coincide in time.

Since the short time constant input filter to this channel tends to differentiate the pulse, the output of the low pass filter is passed through direct current restoring network comprising resistor 52 and diode 53.

The output of the direct current restored is applied to the control grid of tube 54 which is part of the mixer network previously mentioned.

To minimize the effect of variations in the characteristics of inidivdual tubes, degenerative resistors 45, 61, 55, 68 and 78 are placed in the cathode circuits of tubes 44, 60, 54, 67, and 77 respectively.

Although I have shown and described only a certain and specific embodiment of the invention, I am fully aware of the many modifications possible thereof. Therefore, this invention is not to be limited except insofar as is necessitated by the spirit of the prior art and the scope of the appended claims.

The invention described herein may be manufactured and used by or for the Government of the United States of America for governmental purposes without the payment of any royalties thereon or therefor.

What is claimed is:

1. In a radio echo detection system comprising a tunable transmitter and a receiver having an intermediate frequency amplifier section that has a broad dynamic range for pulsed signals, said dynamic range being unaffected by the presence of continuous signals, and that provides less gain for continuous signals than for pulsed signals when said continuous signals are substantially greater in amplitude than said pulsed signals, said continuous signals having a frequency differing from said pulse signals by at least a minimum frequency substantially equal to the highest video components in said pulsed signals the combination of, a linear detector coupled to the output of said intermediate frequency amplifier section, a first channel of amplification coupled to said detector and including means operative to pass substantially only the heterodyne difference frequencies of said pulsed signal and said continuous signal, a second channel of amplification coupled to said detector and including means operative to pass substantially only the video frequencies of said pulsed signal, said second channel being rendered inoperative when the average amplitude of the output of said detector exceeds a selected value, and means coupled to said two channels for combining the outputs of said two channels.

2. In a radio echo detection system comprising a tunable transmitter and a receiver having an intermediate frequency amplifier section that has a broad dynamic range for pulsed signals, said dynamic range being unaffected by the presence of continuous signals, and that provides less gain for continuous signals than for pulsed signals when said continuous signals are substantially greater in amplitude than said pulsed signals, said continuous signals having a frequency differing from said pulse signals by at least a minimum frequency substantially equal to the highest video components in said pulsed signals the combination of, a linear detector coupled to the output of said intermediate frequency amplifier section, a first channel of amplification coupled to said detector and including means operative to pass substantially only the heterodyne difference frequencies of said pulsed signal and said continuous signal, a second channel of amplification coupled to said detector and including means operative to pass substantially only the video frequencies of said pulsed signal, rectifier means generating a unilateral control voltage proportional to the average amplitude of the output of said detector, said second channel being rendered inoperative by said unilateral control voltage when said unilateral control voltage exceeds a selected value, and means coupled to said two channels for combining the outputs of said two channels.

3. In an anti-jam radio echo detection system which includes a receiver for demodulating pulse modulated signals subject to continuous wave interference signals, a transmitter adapted to be tuned to a frequency differing from the carrier of said continuous signals by a predetermined minimum frequency substantially equal to the highest video components in the pulse signals therefrom, intermediate frequency means in said receiver responsive to received signals to derive intermediate frequency components therefrom, a linear detector coupled to said intermediate frequency means, a first signal translating channel coupled to said detector and including means operative to pass substantially only the detected signal components having a frequency above said minimum frequency, a second signal translating channel coupled to said detector and including means operative to pass substantially only the signal components below said minimum frequency, means for blocking said second channel upon the amplitude ratio of continuous signal to pulse signal exceeding a predetermined ratio, and means coupling said first and second channels for combining the outputs thereof.

4. In an anti-jam radio echo detection system which includes a receiver for demodulating pulse modulated signals subject to continuous wave interference signals, a transmitter adapted to be tuned to a frequency differing from the carrier of said continuous signals by a predetermined minimum frequency of the order of the highest video components of the pulse signals therefrom, intermediate frequency means in said receiver responsive to received signals to derive intermediate frequency components therefrom, a linear detector coupled to said intermediate frequency means, first signal translating means coupled to said detector and including a high pass filter having a cut-off frequency of substantially said minimum frequency for passing only the heterodyne difference frequencies of said continuous and pulse signals, second channel means coupled to said detector and including a low pass filter having a cut-off frequency of substantially said minimum frequency for passing only the video frequency components of said pulse signals, means for blocking said second channel upon the amplitude ratio of continuous signal to pulse signal exceeding a predetermined value, and means coupling said first and second channels for combining the outputs thereof.

5. In an anti-jam receiver operative to demodulate pulse modulated signals which are subject to continuous wave interference signals having a carrier differing in frequency from the pulse signals carrier by at least a predetermined minimum frequency of the order of the highest video components of said pulse signals, intermediate frequency means responsive to received signals to derive intermediate frequency components therefrom, a linear detector coupled to said intermediate frequency means, a first channel coupled to said detector and including means operative to pass substantially only the detected signal components having a frequency above said minimum frequency, a second channel coupled to said detector including means operative to pass substantially only the detected signal components below said minimum frequency, means for blocking said second channel upon the amplitude ratio of continuous signal to pulse signal exceeding a predetermined value, and means coupling said first and second channels for combining the outputs thereof.

6. In an anti-jam receiver operative to demodulate pulse modulated signals which are subject to continuous wave interference signals having a carrier differing in frequency from the pulse signal carrier by at least a predetermined minimum frequency of the order of the highest video components of said pulse signals, intermediate frequency means responsive to received signals to derive intermediate frequency components therefrom, a linear detector coupled to said intermediate frequency means, first channel means coupled to said detector and including a high pass filter having a cut-off frequency of substantially said minimum frequency for passing only the heterodyne difference frequencies of said continuous and pulse signals, second channel means coupled to said detector and including a low pass filter having substantially the same cut-off frequency as said high pass filter for passing only the video frequency components of said pulse signals, means for blocking said second channel upon the amplitude ratio of continuous signal to pulse signal exceeding a predetermined value, and means coupling said first and second channels for combining the outputs thereof.

7. In an anti-jam receiver operative to demodulate pulse modulated signals which are subject to continuous wave interference signals having a carrier differing in frequency from the pulse signal carrier by at least a predetermined minimum frequency of the order of the highest video components of said pulse signals, intermediate frequency means responsive to received signals to derive intermediate frequency components therefrom, a linear detector coupled to said intermediate frequency means, high pass filter means having a cut-off frequency of substantially said minimum frequency and coupled to the output of said detector for passing only the heterodyne difference frequencies of said continuous and pulse signals, low pass filter means having substantially the same cut-off frequency as said high pass means coupled to the output of said detector for passing only the video frequency components of said pulse signals, means operative to block output from said low pass filter means upon the amplitude ratio of continuous signal to pulse signal exceeding a predetermined value, and means coupled to said low and high pass filter means for combining the outputs thereof.

8. In an anti-jam radio echo detection system which includes a receiver for demodulating pulse modulated signals subject to continuous wave interference signals, a transmitter adapted to transmit pulse signals on predetermined frequencies, said transmitter adapted to be tuned to and to transmit a frequency differing from the carrier of said continuous signals by a predetermined minimum frequency substantially equal to the highest video components in the said pulse signals, means in said receiver tuned to receive signals comprising said transmitted frequency and said continuous wave interference signals, intermediate frequency means in said receiver responsive to said received signals to derive intermediate frequency components therefrom, including a heterodyned interfering signal and a heterodyned pulse signal, means coupled to said intermediate frequency means to heterodyne together the video components in said heterodyned pulse signal and said heterodyned interfering signal, a first signal translating channel coupled to said detector and including means operative to pass substantially only the heterodyned signal components having a frequency above said minimum frequency, a second signal translating channel coupled to said heterodyning means and including means operative to pass substantially only the signal components below said minimum frequency, means for blocking said second channel upon the amplitude ratio of continuous signal to pulse signal exceeding a predetermined ratio, and means coupling said first and second channels for combining the outputs thereof.

9. In an anti-jam radio echo detection system which includes a receiver for demodulating pulse modulated signals subject to continuous wave interference signals, a transmitter adapted to transmit pulse signals on predetermined frequencies, said transmitter adapted to be tuned to and to transmit a frequency differing from the carrier of said continuous signals by a predetermined minimum frequency substantially equal to the highest video components in said pulse signals, means in said receiver tuned to receive signals comprising said transmitted frequency and said continuous wave interference signals, intermediate frequency means in said receiver responsive to said received signals to derive intermediate frequency components therefrom, including a heterodyned interfering signal and a heterodyned pulse signal, means coupled to said intermediate frequency means to heterodyne together the video components in said heterodyned pulse signal and said heterodyned interfering signal, a first channel means coupled to said heterodyning means and including a high pass filter having a cut-off frequency of substantially said minimum frequency for passing only the heterodyne difference frequencies of said heterodyned interfering signal and heterodyned pulse signal, second channel means coupled to said detector and including a low pass filter having a cut-off frequency of substantially said minimum frequency for passing only the video frequency components of said heterodyned pulse signals, means for blocking said second channel upon the amplitude ratio of continuous signal to pulse signal exceeding a predetermined value, and means coupling said first and second channels for combining the outputs thereof.

10. In an anti-jam receiver operative to demodulate pulse modulated signals which are subject to continuous wave interference signals having a carrier differing in frequency from the pulse signal carrier by at least a predetermined minimum frequency of the order of the highest video components of said pulse signals, means in said receiver tuned to receive signals comprising said pulse modulated signals and said continuous wave interference signals, intermediate frequency means in said receiver responsive to said received signals to derive intermediate frequency components therefrom, including a heterodyned interfering signal and a heterodyned pulse signal, means coupled to said intermediate frequency means to heterodyne together the video components in said heterodyned pulse signal and said heterodyned interfering signal, a first translating channel coupled to said detector and including means operative to pass substantially only the heterodyned signal components above said minimum frequency, a second signal translating channel coupled to said heterodyning means and including means operative to pass substantially only the signal components below said minimum frequency, means for blocking said second channel when substantially all said pulse signal energy is contained in the heterodyned signal components above said minimum frequency, and means coupling said first and second channels for combining the outputs thereof.

11. In an anti-jam receiver operative to demodulate pulse modulated signals which are subject to continuous wave interference signals having a carrier differing in frequency from the pulse signal carrier by at least a predetermined minimum frequency of the order of the highest video component of said pulse signals, means in said receiver tuned to receive signals comprising said pulse modulated signals and said continuous wave interference signals, intermediate frequency means in said receiver responsive to said received signals to derive intermediate frequency components therefrom, including a heterodyned interfering signal and a heterodyned pulse signal, means coupled to said intermediate frequency means to heterodyne together the video components in said heterodyned pulse signal and said heterodyned interfering signal, a first translating channel coupled to said detector and including means operative to pass substantially only the heterodyned signal components above said minimum frequency, a second signal translating channel coupled to said heterodyning means and including means operative to pass substantially only the signal components below said minimum frequency, means coupled to said heterodyning means for generating a unilateral control voltage whose magnitude is proportional to the intensity of said heterodyned interfering signal, means for suppressing the output of said second signal translating channel when said control voltage is above a predetermined value relative to the amplitude of said received pulse signal, and means coupling said first and second channels for combining the output thereof.

References Cited in the file of this patent

UNITED STATES PATENTS

| | | |
|---|---|---|
| 1,495,470 | Farrington | May 27, 1924 |
| 1,660,930 | MacDonald | Feb. 28, 1928 |
| 1,993,859 | Roberts | Mar. 12, 1935 |
| 2,054,647 | Ballantine | Sept. 15, 1936 |
| 2,103,878 | Thompson | Dec. 28, 1937 |
| 2,165,304 | Runge et al. | July 11, 1939 |
| 2,406,316 | Blumlein et al. | Aug. 27, 1946 |
| 2,410,736 | Hoisington | Nov. 5, 1946 |
| 2,490,808 | Hoffman | Dec. 13, 1949 |